United States Patent [19]
Pitanis

[11] 3,900,181
[45] Aug. 19, 1975

[54] DUAL PURPOSE SOCK HOLDER

[76] Inventor: Nicholas James Pitanis, 1819 Carolyn Dr., Lexington, Ky. 40502

[22] Filed: Jan. 15, 1974

[21] Appl. No.: 433,833

[52] U.S. Cl. ................................. 248/340; 223/87
[51] Int. Cl. ...................... A44b 17/00; A47j 51/08
[58] Field of Search .................. 248/340, 339, 317; 211/113; 223/85, 87; 24/84 B

[56] References Cited
UNITED STATES PATENTS

| | | | |
|---|---|---|---|
| 2,349,200 | 5/1944 | Ringler | 223/87 |
| 3,329,386 | 7/1967 | Rosen | 248/340 |
| 3,370,765 | 2/1968 | Jossem | 223/87 |
| 3,381,865 | 5/1968 | Pehr | 223/87 |
| 3,650,442 | 3/1972 | Berns | 223/87 |
| 3,738,549 | 6/1973 | Driscoll | 223/85 |
| 3,755,859 | 9/1973 | Solari | 24/84 B |
| 3,790,045 | 2/1974 | Rigel | 223/87 |
| D167,727 | 9/1952 | Teare | 223/85 X |
| D204,342 | 4/1966 | Larkin | 223/85 X |

*Primary Examiner*—J. Franklin Foss
*Attorney, Agent, or Firm*—Kemon, Palmer & Estabrook

[57] ABSTRACT

A dual purpose holder for a pair of man's socks or other hose by which the hose may be hung for sales display purposes and also paired together for laundering purposes comprises a planar retainer member with two openings, each of such size as to permit one of the hose to be draped therethrough and retained therein during laundering of the hose, and a hook-like hanger member attached to the retainer member at one side in a way that permits the hanger member to be separated from the retainer member after the holder has served its display function.

8 Claims, 10 Drawing Figures

3,900,181
FIG.1
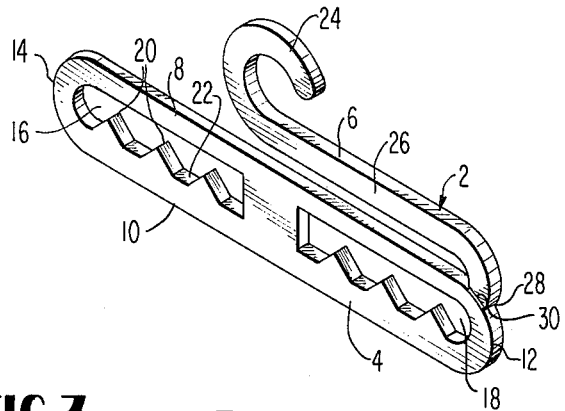
FIG.3
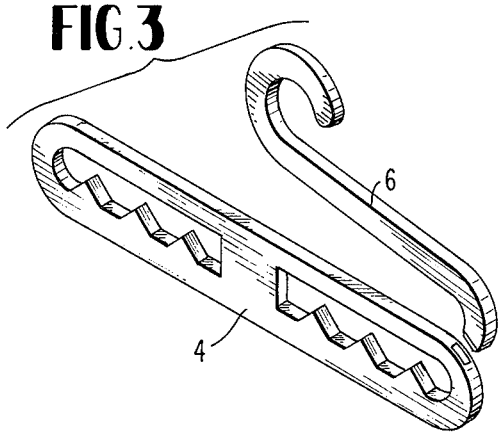
FIG.2
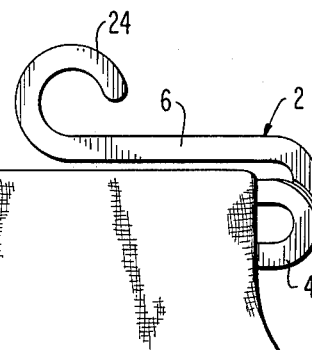
FIG.4
FIG.5
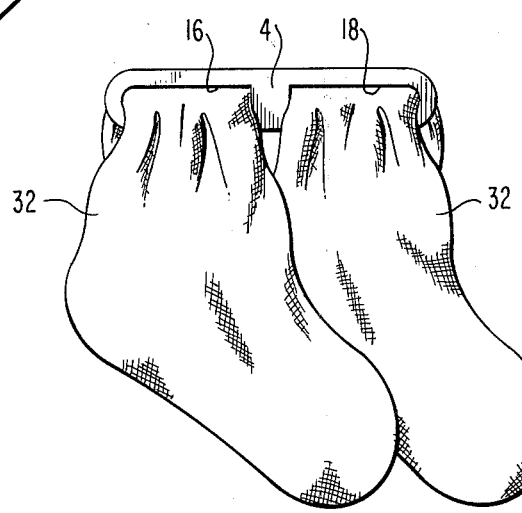

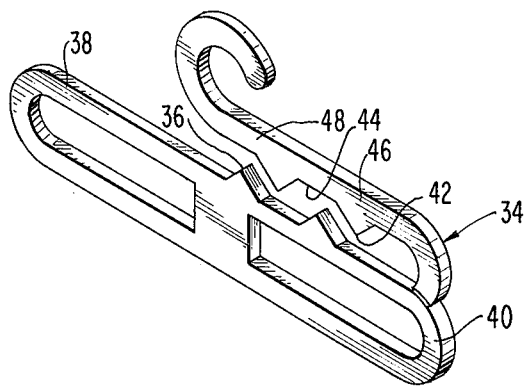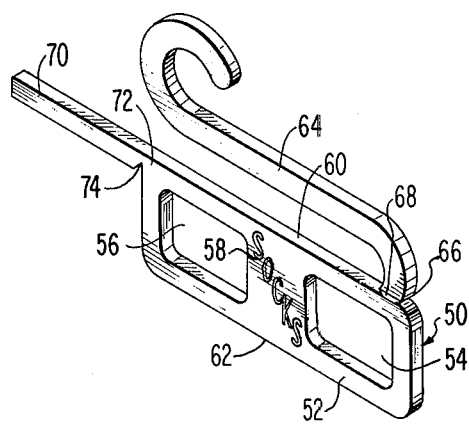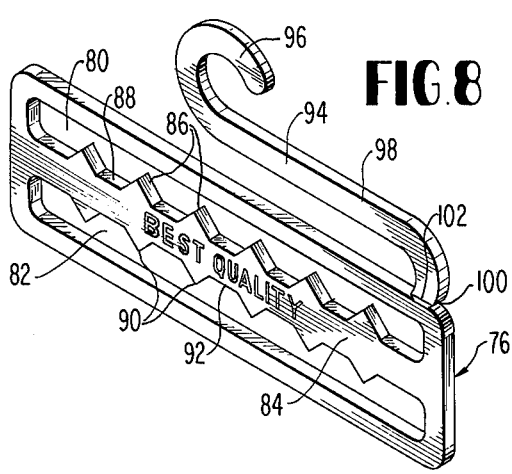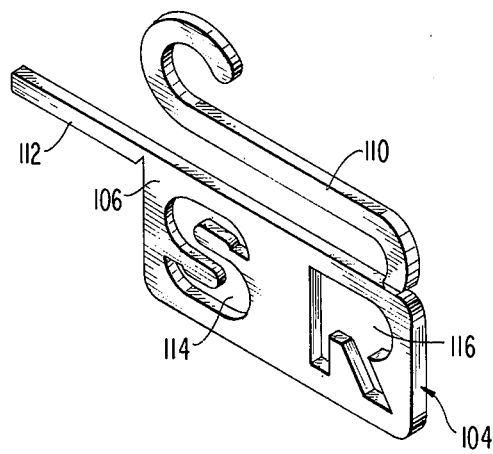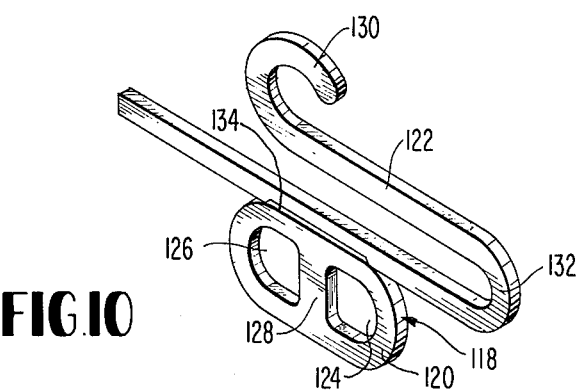

DUAL PURPOSE SOCK HOLDER

BACKGROUND OF THE INVENTION

1. Field of the Invention

The invention relates to holders for men's socks or other hose which permit the hose to be hung for sales display purposes and later to be retained together as a pair for laundering.

The task of laundering men's socks or similar pairs of hose presents difficulties because of the similarities of hue and texture of men's socks whether there be only one member in the family wearing such hose or a number of family members. Much of the modern day home laundering involves drying in automatic tumble driers. Where hose are made of synthetic fibers, the handling and sorting of hose is further complicated by the static electrical charges which tend to hold mismatched hose together. Even when the hose are not dried in this manner there is the problem of sorting and matching them after they have been laundered in a washing machine. Some of the drudgery of household laundering could be eliminated by reducing the work required for sorting and matching of men's socks or similar hose as part of the task of laundering household clothing.

2. Description of the Prior Art

A variety of hangers have been developed over which socks or other hose can be draped and displayed for sales purposes, e.g., see U.S. Pat. No. 2,164,534. Such hangers may be of planer configuration and include a hook member which extends from the top of the hanger so that it may be held upon a support rod or the like, e.g., see U.S. Pat. No. 3,329,386.

In the laundering of household clothing items in washing machines, it is known to use fabric bags, mesh containers or other devices to hold desired garments together either to protect them against wear or abrasion, to facilitate sorting upon completion of the washing operation or for other purposes. Clips or other devices have also been used to hold together garments during laundering.

OBJECTS

A principal object of this invention is the provision of new forms of holders for men's socks or other hose by which the hose may be hung for sales display purposes and also retained together during laundering so that the task of laundering is shortened by reducing time required for sorting and matching of pairs of hose. Further objects include the provision of:

1. Dual purpose sock holders that can provide sale advertising, logo or other messages or devices.

2. Such holders which may be separated into their functional parts after the holder has served its sales display purpose.

3. New forms of sock holders which have utility in two separate fields, namely, the merchandising field and the consumer field.

4. A device which provides an integrated system of filling the need of a merchant for display hangers for socks in the sale of such items and the need of the consumer for keeping socks in pairs throughout the course of their use.

5. Dual purpose sock holders which will not damage socks or other clothing or laundering equipment when used as means for maintaining socks in pairs during washing or drying.

Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description.

SUMMARY OF THE INVENTION

These objects accomplished according to the present invention by the provision of dual purpose holders for pairs of hose which comprise a retainer member, a hanger member integral therewith, the retainer member being planar in configuration, two separate transverse openings in the retainer member, each opening being of such size that one hose of a pair may be draped through the opening and retained therein during a normal laundering of the hose, the hanger being a sinuous rod having a C-shaped free end portion held spaced from the retainer member by an elongated leg portion, the hanger member being coplanar with the retainer member and attached thereto by the leg portion, the attachment being defined by a groove or other demarcation along which the hanger member may be separated from the retainer member by reasonable severance force.

Advantageously, the edges which define the openings in the retainer member will present a plurality of undulations that can serve to prevent hose draped through the openings from slipping out when the retainer member is used to hold a pair of hose together during the laundering.

Holders of the invention may be made in a variety of basic forms and produced from different materials. Advantageously, they are made of molded plastic and can be produced in various colors. Whatever material is used for their construction should be non-corrosive and able to withstand temperature and other conditions which are encountered during normal washing and/or drying in modern automatic laundering equipment.

BRIEF DESCRIPTION OF THE DRAWING

A more complete understanding of the new dual purpose sock holders of the invention and their manner of use may be had by reference to the accompanying drawings in which:

FIG. 1 is perspective side view of a complete dual purpose sock holder in accordance with the invention.

FIG. 2 is a side view showing hose displayed upon the holder of FIG. 1.

FIG. 3 is a perspective side view showing the holder of FIG. 1 being separated into its two functional parts.

FIG. 4 is a plan view showing a pair of socks draped through the retainer member of the sock holder to be held together during washing or drying.

FIG. 5 is an end view comparable to FIG. 4.

FIG. 6 is a perspective view of another form of sock holder in accordance with the invention.

FIG. 7 illustrates yet another form of the new sock holders.

FIG. 8 illustrates a sock holder of the invention in which sock retaining openings in the device are positioned over and under one another rather than side by side.

FIG. 9 illustrates an embodiment of the new sock holders in which the openings through which socks are draped for pairing during laundering define letters of the alphabet giving the device further identification ability.

FIG. 10 is a perspective view of yet another embodiment of a sock holder of the invention.

DESCRIPTION OF PREFERRED EMBODIMENTS

Referring in detail to the drawings, the dual purpose sock holder 2 comprises a retainer member 4 and a hanger member 6 which are formed as an integral unit by being molded from plastic material, stamped with sheet metal or made from any other material which will not corrode, melt, disintegrate or otherwise be impaired or destroyed when subject to normal household laundering operations.

The retainer member 4 is an oblong planar element having two parallel elongated sides 8 and 10 and two short ends 12 and 14. Two transverse openings 16 and 18 extend through the retainer member 4. A plurality of undulations such as teeth 20 are formed integrally along the bottom edge 22 of each of the openings 16 and 18. These serve to retain hose which have been draped through openings in the retainer member when this is used to hold together a pair of hose for laundering purposes.

The hanger member 6 is a sinuous rod having a C-shaped free end portion 24 and an elongated leg portion 26. The hanger member 6 is coplanar with the retainer member 4 and is attached thereto at the end 28 of the leg portion 26. The point of attachment between the retainer member 4 and the hanger member 6 is defined by a groove or other demarcation 30 along which the hanger member 6 may be separated from the retainer member 4 as illustrated in FIG. 3.

For use of the dual purpose sock holder for sales display purposes, a pair of socks 32 will be hung as shown in FIG. 2 over the top elongated edge 8 of the retainer member 4 of the holder 2. With the socks 32 supported in this manner, the holder 2 can be hung from a rod (not shown) or any other suitable support by placing the C-shaped end portion 26 over the rod.

When a customer purchases a pair of socks which have been displayed by the holder as illustrated in FIG. 2, the display function of the holder will have been completed and the hanger member 6 can be separated from the retainer member 4 (see FIG. 3) and discarded. The retainer member will then be used to hold together a pair of socks during laundering as shown in FIGS. 4 and 5 by draping the socks 32 individually through the separate transverse openings 16 and 18.

In the modified form of sock holder 34 as shown in FIG. 6, a pair of teeth 36 are formed integrally with the upper edge 38 of the retainer member 40 and a related pair of teeth 42 are formed along the lower edge 44 of the leg portion 46 comprising the hanger member 48. These teeth 36 and 42 will serve to retain a pair of socks hung for display purposes on the holder 34 in a manner illustrated in FIG. 2 and prevent slippage of the socks and their displacement from the holder.

In the modified form of sock holder 50 shown in FIG. 7, the retainer member 52 is rectangular in shape and has two rectangular holes therein 54 and 56 which are separated by the rib 58 that extends centrally of the rectangle 52 and runs perpendicular to the long sides 60 and 62. The hanger member 64 is attached at one upper corner 66, the line of attachment being defined by a groove 68 which serves as a point of breakage or separation of the retainer member 52 from the hanger member 64. A rod-like projection 70 extends from the other upper corner 72 of the rectangle 52, the attachment of the projection 70 to the rectangle 52 being defined by a notch or groove 74 which serves to permit the projection 70 to be broken away from the retainer member 52 when the same thing is done with the hanger member 64 for converting the holder only into its sock retaining function. The use of a rod-like projection 70 serves to extend the side 60 of the member 52 so that when a pair of socks are hung on the holder 50 their entire width will be supported along the upper edge 60. This enables the retainer member 52 to be shortened in length as compared with other embodiments such as the retainer 4 of FIG. 1.

The form of sock holder 76 shown in FIG. 8 comprises the retainer member 78 which is substantially a flat rectangle through which the rectangular slots 80 and 82 extend. Major axis of each slot is parallel to the major axis of the rectangle and the slots are separated by a rib 84 that extends centrally of the rectangular member 78 along the major axis thereof. Teeth 86 are formed integrally with the top side 88 of the rib 84 and teeth 90 are formed integrally with the lower side 92 of the rib 84. These teeth can serve to keep socks which are inserted through the slots 80 and 82 for laundering purposes from falling out of the slots. The hanger member 94 having the C-shaped free end portion 96 and an elongated leg portion 98 is attached to the retainer member 78 at the upper corner 100, the line of attachment being defined by the groove 102 which aids in disconnecting the hanger member 94 from the retainer member 78 for purposes as described previously.

As illustrated in FIGS. 7 and 8, portions, such as the ribs 58 or 84, can be marked for a variety of purposes. For example, such markings might be sales advertising statements, a manufacturers logo or other markings. Alternatively, markings might be numerals to serve as visual codes or dots which would be in the form of braille to facilitate individual identification of the socks which have been paired in the retainer members 52 and 78 for laundering purposes.

In the embodiment of the holder 104 shown in FIG. 9, there is a rectangular retainer member 106 to which is attached a hanger member 110 and a rod-like extension 112 in a manner similar to that described for the holder 50 of FIG. 7. In this embodiment, however, the openings 114 and 116 through which a pair of socks may be draped as illustrated in FIGS. 4 and 5, define letters of the alphabet. Such configuration for the openings serve, in addition to retaining the pair of socks together during laundering, to provide markings for purposes as previously described in connection with FIGS. 7 and 8.

The sock holder 118 of FIG. 10 comprises a retainer member 120 and a hanger member 122. The retainer member 120 has a pair of holes 124 and 126 therethrough separated by the rib 128. The hanger member 122 is in the form of a sinuous rod having a C-shaped free end portion 130 and an elongated leg portion 132. The hanger member 122 is coplanar with the retainer member 120 and is attached thereto by the leg portion 132, the line of attachment being defined by a groove 134 which aids in separation of the retainer member 120 from the hanger member 122 for the purposes of using the holder only for its sock retaining function as described before.

Sock holders of the invention are advantageously produced or manufactured by being molded as an integral unit from any suitable plastic or metal. Alternatively, however, the holders may be manufactured in separate pieces, such as the retainer member and hanger member, and these could then be joined to form the completed holder such as by cementing, welding or the like. The appearance or style of the new sock holders may be with all or parts of each portion thereof in either round, oval, square or rectangular cross-section or a variety of these in certain portions for any desired purpose such as aesthetics, labeling, directions, manufacturers identification or the like.

Whatever material is used for construction of the new sock holders, it should be capable of resisting the corrosive action of soaps and detergents normally used in household laundering and be able to withstand the normal range of heat temperatures used in residential or commercial driers. Such resistance for the construction material would be required for repeated exposure to laundering operations without malfunction.

The sock holders can be made available in any desired colors to suit a specific merchandising theme, for color coding purposes to identify household members, or, alternatively, to denote the color of hose with which the holder is to be associated.

While a preferred embodiment of the present invention has been herein shown and disclosed, applicant claims the benefit of a full range of equivalents within the scope of the appended claims.

I claim:

1. A dual purpose holder for a pair of hose by which the hose may be hung for sales display purposes and paired together for laundering purposes which comprises a retainer member,
a hanger member integral therewith,
said retainer member being planar in configuration,
two separate transverse openings in said retainer member, each opening being of such size that one hose of a pair may be draped therethrough and retained therein during a normal laundering of the hose,
said hanger member being a sinuous rod having a C-shaped free end portion held spaced from said retainer member at one side thereof by an elongated leg portion,
said hanger member being coplanar with said retainer member and attached thereto by said leg portion,
said attachment being defined by a demarcation along which the hanger member may be separated from the retainer member by severance force.

2. A dual purpose holder of claim 1 wherein edges that define said transverse opening in said retainer member present a plurality of undulations that can serve to prevent a hose draped through the opening from slipping out of the opening.

3. A dual purpose holder of claim 1 wherein said retainer member is elongated along an axis that parallels the longitudinal axis of the major section of said leg portion of the hanger member.

4. The holder of claim 3 wherein said openings in the retainer member are slots elongated along an axis that parallels said axis of elongation of the retainer member.

5. The holder of claim 4 wherein said slots are separated from one another by a rib that runs normal to the axis of elongation of the retainer member.

6. The holder of claim 4 wherein said slots are separated from one another by a rib that runs parallel to the axis of elongation of the retainer member.

7. A dual purpose holder for a pair of hose by which the hose may be hung for sales display purposes and paired together for laundering purposes which comprises a retainer member,
a hanger member integral therewith,
said retainer member being planar in configuration,
two separate transverse openings in said retainer member, each opening being of such size that one hose of a pair may be draped therethrough and retained therein during a normal laundering of the hose,
said hanger member being a sinuous rod having a C-shaped free end portion held spaced from said retainer member by an elongated leg portion,
said hanger member being coplanar with said retainer member and attached hereto by said leg portion,
said attachment being defined by a demarcation along which the hanger member may be separated from the retainer member by severance force, and
a rod-like projection extending from one side of said retainer member coplanar therewith, the attachment of said projection of said retainer member being defined by a demarcation along which the projection may be separatedd from the retainer member by severance force.

8. A dual purpose holder for a pair of hose by which the hose may be hung for sales display purposes and paired together for laundering purposes which comprises a retainer member,
a hanger integral therewith, and
a rod-like element,
said retainer being planar in configuration,
two separate transverse openings in said retainer member, each opening being of such size that one hose of a pair may be draped therethrough and retained therein during a normal laundering of the hose,
said hanger member having a C-shaped free end portion coplanar with said retainer member and attached thereto by a depending portion,
said attachment being defined by a demarcation along which the hanger member may be separated from the retainer member by severance force,
said rod-like element depending from one side of said retainer member coplanar therewith, the attachment of said element to said retainer member being defined by a demarcation along which the element may be separated from the retainer member by severance force.

* * * * *